Figure 1:
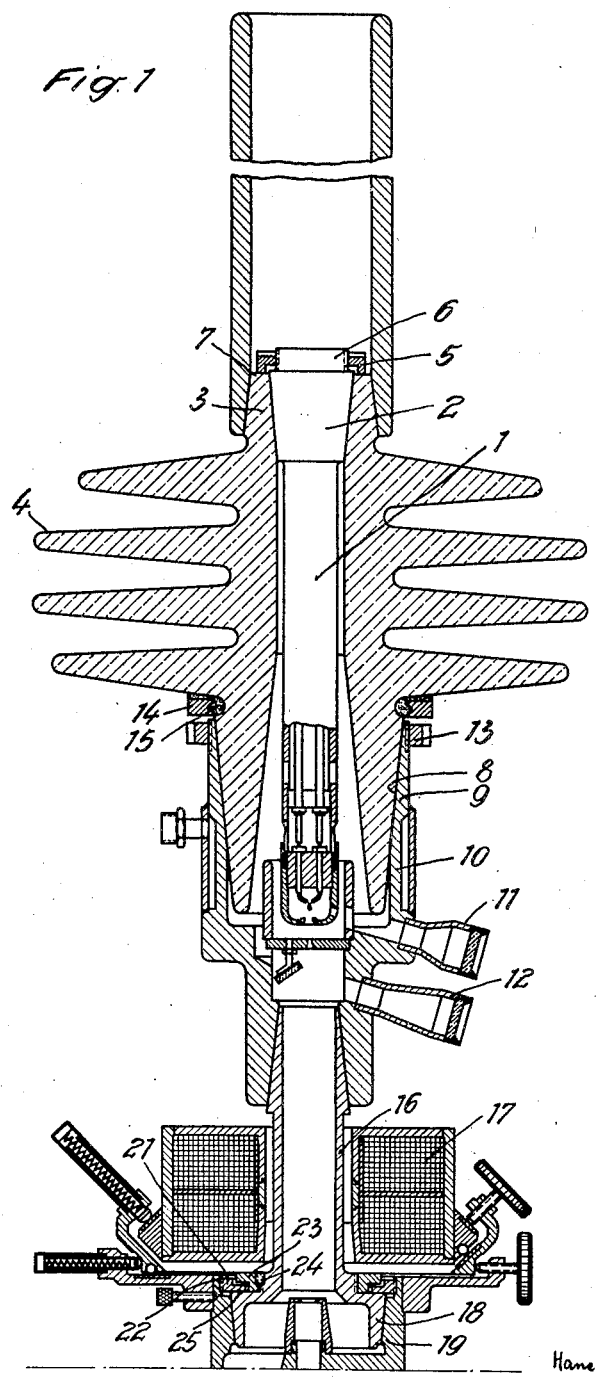

Dec. 15, 1942.  H. SCHUCHMANN ET AL  2,305,459
ELECTRONIC MICROSCOPE
Filed Feb. 28, 1940  2 Sheets-Sheet 1

Inventors
Hans Schuchmann,
Bodo von Borries,
Helmut Ruska
by Knight Bros
Attorneys

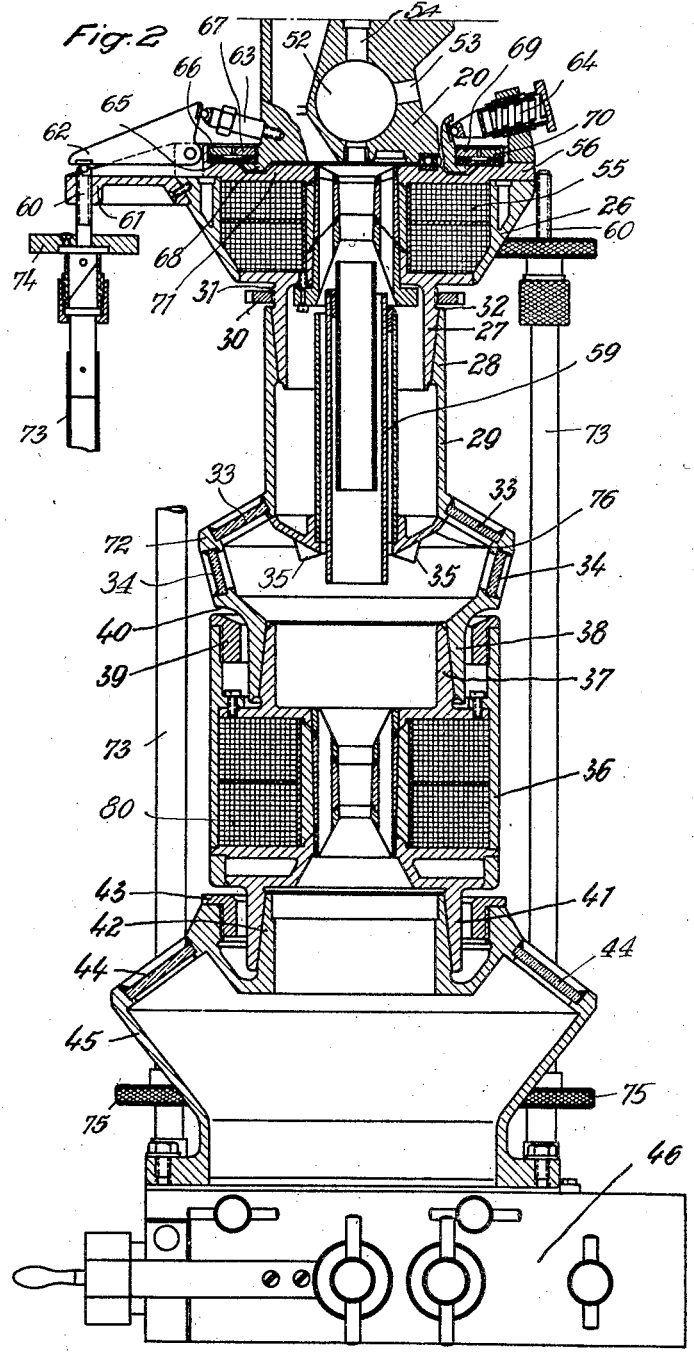

Patented Dec. 15, 1942

2,305,459

UNITED STATES PATENT OFFICE 2,305,459

ELECTRONIC MICROSCOPE

Hans Schuchmann and Bodo von Borries, Berlin-Spandau, and Helmut Ruska, Berlin-Nikolassee, Germany; vested in the Alien Property Custodian Application February 28, 1940, Serial No. 321,238
In Germany November 11, 1938

6 Claims. (Cl. 250—49.5)

This invention relates to improvements in electronic microscopes.

As is well known, electronic microscopes consist of a large number of individual parts which support, for instance, the electron producing device, the condenser lens, the sluicing device, the magnifying lenses and the like. These individual parts must be assembled to form a pressure-tight vessel. To seal the individual parts with respect to one another, it is common practice to provide the parts at the points where they are assembled with ground sealing cones engaging one another in a corresponding manner. The cones ensure a sufficient tightness even when in operation for a number of years, so that it is possible to maintain the vacuum necessary for operating the electronic microscope. The disengagement of these sealing cones, which is occasionally necessary for replacing coils or the like, encountered hitherto great difficulties, since these cones, particularly when in operation for a very long period, are in a jammed state. In the types hitherto known it may therefore happen that the cones when being brought out of engagement become damaged so that the particular part of the electronic microscope can no longer perform its proper function.

The object of the present invention is to remove the above drawbacks in a simple manner. To this end, the invention provides adjacent parts of the microscope vessel, engaging each other with the aid of a sealing cone structure, with a screw nut seated on a threaded portion of one of the two parts so as to exert, when screwed in the proper direction, a force against the other part tending to disengage the sealing cone from its conical seat. By means of these screws it is possible to disengage the individual parts in a simple manner and without damaging the same, since the screws permit exerting a concentric pressure on the cone to be removed.

Another object of the invention consists in the improvement of the adjusting devices for the electronic microscope and in simplifying the operation of the apparatus. According to the invention, adjusting devices, such as adjusting screws, eccentric controls or the like located at a certain distance from the place of the observer, are extended to a point which is easily accessible for the observer and provided at this point with knobs or handles. This feature of the invention renders it possible to adjust the individual parts of the electronic microscope in an exact manner without the observer having to leave his seat. The arrangement is preferably so designed that besides these knobs for adjusting the screws or the like, easily accessible from the seat of the observer, further knobs to be less frequently actuated are arranged in the neighborhood of the aforementioned nuts or threads, i. e. at a certain distance from the seat of the observer.

The invention may be carried into practice in various ways, as will be apparent from the following description of the embodiment shown in the drawings in which Figs. 1 and 2 illustrate by sectional views the upper and the lower portion, respectively, of an electronic microscope consisting of various individual parts provided with sealing cones.

In the drawings, 1 denotes the holder for the electron producing device of the electronic microscope. The electron beam issuing from this device passes through the magnetic field of a condensing lens 17 (Fig. 1) before it impinges upon the object whose magnified image is to be produced. The object is located in the chamber 52 of a sluicing device 20 (Fig. 2). Thence the beam, modified in accordance with the electron-optical texture of the object, passes through the lens field of an objective coil 55 which produces an intermediate image, invisible or made visible by fluorescent means, in the interior of an intermediate vessel section 29, whence the beam reaches the lens field of a projection coil 80 throwing an enlarged image onto a luminescent screen disposed in the base section 46 of the instrument.

The holder 1 of the electron source is provided at its upper end with a cone 2 which fits a corresponding cone 3 of an insulating body 4 forming the uppermost section of the microscope vessel. To disengage these two cones a nut 5 is provided which is screwed in the upper end 6 of the holder 1, provided with a corresponding thread. To disengage the cone the nut 5 is turned in the downward direction and presses against the upper edge 7 of the insulating body.

The insulating body itself has at its lower end a sealing cone 8 which is in engagement with a correspondingly shaped part 9 of the intermediate piece 10 forming a second section of the microscope vessel, inspection windows 11 and 12 being secured to the piece 10 for inspecting the operation of the electron producing device. To disengage the cones 8 and 9, a nut 13 is provided which is screwed on a corresponding outer thread provided in the upper part of the intermediate piece 10. When assembling the parts 4 and 10, the nut 13 is screwed on part 10, after which a pressure ring 14 is placed on the nut.

When the cones 8 and 9 have been brought into engagement with each other, the pressure ring 14 is firmly secured in this position to the body 4 by a binding agent, as indicated at 15. In this manner the nut 13 serving to disengage the cones when separating parts 4 and 10 from each other engages the pressure piece 14 in a uniform manner, thus exerting a uniform concentrical pressure on the body 4.

16 denotes a third section of the vacuum wall of the electronic microscope. This section is tightly joined with part 10 and surrounded by the condenser coil 17. The piece 16 has at its lower end a cone 18 in engagement with a correspondingly shaped part 19 of the body of the object sluice 20, the latter forming the fourth consecutive section of the vessel structure. The cone 18 is firmly pressed against the cone 19 with the aid of the pressure nut 21. This nut is screwed into the upper end of the sluice body 20 provided with an inner thread 22 and also serves to disengage, if necessary, the two cones. To this end, a nut 23 is in engagement with the cone 18 and is secured against rotation by means of a set screw 24. To disengage the cones the nut 21 is turned so as to move in the upward direction and its inner, flange-shaped portion 25 is pressed against the lower side of the correspondingly designed nut 23.

26 denotes another section of the structure. This section carries the objective coil 55 and has at its lower end a sealing cone 27 fitting in the sealing cone 28 of a sixth section 29 of the vacuum wall. The cones 27 and 28 are disengaged by the nut 30 which is screwed on the thread 31 of the objective coil body 26 before bringing the cones into engagement with each other. To separate or loosen the cones, the nut 30 is turned so as to move in the downward direction and thus is pressed against the upper end 32 of the cone 28. 33 and 34 denote inspection windows inserted in an enlarged portion 72 of section 29. Through windows 33 an intermediate image produced by the projection coil may be directly viewed by the observer when he stands, while a prism 35 permits an indirect observation through each window 34 when the observer is seated. 36 designates a further vessel section which forms the body of the projection coil 80 and has a sealing cone 37 which engages a corresponding sealing cone 38 of the part 29. To bring the two cones out of engagement with one another, use is made of a nut 39 which when turned so as to move in the upward direction presses against the edge 40 thus disengaging the cones.

In a similar manner the lower cone 41 of the projection coil body 36 is brought out of engagement with the cone 42 by means of the nut 43. The cone 42 is integral with the lower part 45 of the electronic microscope provided with inspection windows 44 and secured by screws to the base section 46 serving for the reception of the fluorescent screen.

The body 20 of the sluicing device for introducing the object into the vacuum chamber has a lateral bore 52 (Fig. 2) for receiving a cock plug (not shown) whose cross bore serves to accommodate the object to be tested. 53 is a lateral opening in the sluice body 20 for introducing the object into the cross bore of the cock plug. After such insertion the plug is turned so as to have its bore communicate with the evacuated interior of the vessel so that now the electron stream passing through the opening 54 strikes the object. The objective coil 55 is provided with an upper cover 56. 59 designates a set of screening cylinders serving to protect the electron stream passing through the inner cylinder from being affected by outer magnetic fields.

To select the portion of the object to be magnified, the sluice body 20 containing the object can be moved in any direction transversely to the path of the magnifying electron beam and relatively to the stationary part 26 containing the objective coil 55. The adjustment is effected by adjusting screws 60 which may be turned in the holders 61 so as to move in the upward and downward direction. This adjusting movement of each screw 60 is transmitted to a pressure body 63 firmly secured to the sluicing device 20 by means of a lever 62. 64 denotes a resilient holder opposite to the pressure body 63.

A ring-shaped rubber disk 65 serves to seal the circular opening between the relatively movable parts 20 and 56. The outer periphery of disc 65 is pressed by a pressure ring 66 against the plate 56 and its inner periphery by a pressure ring 67 against a circular flange 68 of the sluicing device 20. To firmly press the pressure rings 66 and 67 two correspondingly threaded rings 69, 70 are employed. The ring 69 is provided with an inner thread which is screwed on a corresponding thread of the sluicing device 20. The ring 70 has an outer thread which is screwed in a corresponding thread of the plate 56. The circular interstice between the two pressure rings 66 and 67 enables the sluice section 20 to move in a transverse direction relatively to the objective coil 55 without interfering with the vacuum in the microscope vessel. The flange 68 has a trapezoidal cross-section which fits in a correspondingly shaped trapezoidal indentation 71 of the plate 56 with sufficient clearance.

In order that the observer when seated may easily effect the fine adjustment of the arrangement during the operation of the microscope, rod-shaped or tubular attachments 73 extending in the downward direction are secured to the adjusting screws 60. These extensions are provided at their lower end with knobs 75, respectively, and at the upper end with knobs 74, respectively. By turning the knobs 75, the observer when seated causes the object to be displaced in a transverse direction relatively to the parts of the electronic microscope placed below the object. The upper adjusting knobs 74 permit making corresponding adjustments when the observer stands and observes the intermediate image through the inspection windows 33.

What is claimed is:

1. In an electronic microscope, a tubular vacuum vessel subdivided transversely with respect to its longitudinal axis so as to form a plurality of consecutive wall sections surrounding said axis, two consecutive and adjoining vessel sections having sealing cones concentric to said axis and engaging each other to form a rigid and vacuum-tight joint, one of said sections having a screw thread concentric to said axis, and a screw nut disposed on said screw thread for contacting a concentric surface of said other section when screwed against it in order to forcibly disengage said sealing cones.

2. In an electron microscope, a vacuum vessel subdivided transverse to the electron-optical axis so as to form a plurality of consecutive wall sections, one of said sections having two sealing cones, one at either end, and the two adjoining sections having each a sealing cone engaging the appertaining cone of the aforesaid section to form a rigid structure comprising said three sections and two conical joints, a screw nut disposed at each of said joints so as to concentrically surround the sealing cones forming the joint, said nut being screwed onto one of said sections and disposed for exerting concentric pressure on the adjoining section when turned so as to move against said latter section, thereby forcibly disengaging the joint.

3. In an electron microscope having an objective lens and a projection lens, in combination, a vacuum vessel subdivided transverse to the electron-optical axis so as to form a plurality of consecutive wall sections, one of said sections carrying said objective lens, another of said sections carrying said projection lens, and a third of said sections being arranged intermediate said first and second said sections, said intermediate vessel section having two sealing cones, one at either end, and the two adjoining sections having each a sealing cone engaging the corresponding cone of said intermediate section to form a rigid structure comprising the lens-carrying vessel sections in rigid but separable relation to each other, and screw means arranged concentrically to said sections for forcibly disengaging said cone pairs to separate said sections from one another.

4. An electronic vacuum device having separable vessel portions adjoining each other, one of said vessel portions having a sealing cone and the other a corresponding conical seat engaging said cone for rigidly joining and tightly sealing said adjoining portions, one of said vessel portions having a screw thread coaxial with said sealing cone and seat, and a screw nut disposed on said thread for contacting and exerting force on said other vessel portion when being screwed against said other vessel portion so as to separate said two portions.

5. An electronic vacuum device having separate vessel portions adjoining each other, one of said vessel portions having a sealing cone and the other a conical seat engaging said cone for rigidly joining and tightly sealing said adjoining portions, a screw thread integral with one of said adjoining parts and surrounding the axis of said cone and seat, a screw nut disposed on said thread for contacting said other part when screwed in one direction, a ring-shaped member firmly secured to said other part and arranged concentrically to said nut to be contacted thereby when the latter is screwed in the other direction, whereby said nut serves to press said sealing cones together as well as to disengage them depending upon its direction of rotation.

6. An electronic vacuum vessel having a first part consisting of ceramic material and provided with a sealing cone, an adjoining second part also having a sealing cone for engaging said first cone, said second part being provided with a screw thread concentric to its sealing cone, a screw nut disposed on said thread, and a separate pressure ring firmly secured to said ceramic part to be contacted by said nut when screwing the latter towards said ceramic part.

HANS SCHUCHMANN.
BODO von BORRIES.
HELMUT RUSKA.